US009185170B1

United States Patent
Grammel et al.

(10) Patent No.: US 9,185,170 B1
(45) Date of Patent: Nov. 10, 2015

(54) CONNECTIVITY PROTOCOL DELEGATION

(71) Applicant: Juniper Networks, Inc., Sunnyvale, CA (US)

(72) Inventors: Gert Grammel, Ditzingen (DE); Chien Yu Li, Saratoga, CA (US); Theodore X. Qian, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 219 days.

(21) Appl. No.: 13/732,126

(22) Filed: Dec. 31, 2012

(51) Int. Cl.
*H04L 12/26* (2006.01)
*H04L 29/08* (2006.01)

(52) U.S. Cl.
CPC .......... *H04L 67/141* (2013.01); *H04L 43/0811* (2013.01); *H04L 43/0829* (2013.01)

(58) Field of Classification Search
CPC .................. H04L 43/0829; H04L 43/0811
USPC .................. 709/223, 225, 226, 232, 228, 203
See application file for complete search history.

(56) References Cited

U.S. PATENT DOCUMENTS

| 7,765,306 | B2 * | 7/2010 | Filsfils et al. | 709/228 |
| 7,821,923 | B2 * | 10/2010 | Kakadia et al. | 370/221 |
| 7,852,778 | B1 * | 12/2010 | Kompella | 370/248 |
| 7,860,981 | B1 * | 12/2010 | Vinokour et al. | 709/227 |
| 7,990,852 | B1 * | 8/2011 | Cirkovic et al. | 370/252 |
| 8,014,275 | B1 * | 9/2011 | Sundt et al. | 370/217 |
| 8,156,209 | B1 * | 4/2012 | Phadnis et al. | 709/223 |
| 8,255,543 | B2 * | 8/2012 | Vinokour et al. | 709/227 |
| 8,311,014 | B2 * | 11/2012 | Valluri et al. | 370/331 |
| 8,331,245 | B2 * | 12/2012 | Zheng | 370/241.1 |
| 2004/0088385 | A1 * | 5/2004 | Blanchet et al. | 709/220 |
| 2006/0248202 | A1 * | 11/2006 | Blanchet et al. | 709/227 |
| 2010/0039956 | A1 * | 2/2010 | Zheng | 370/252 |
| 2010/0138538 | A1 * | 6/2010 | Zheng | 709/225 |
| 2010/0149969 | A1 * | 6/2010 | Rahman et al. | 370/229 |
| 2011/0066735 | A1 * | 3/2011 | Vinokour et al. | 709/227 |
| 2011/0096698 | A1 * | 4/2011 | Wang | 370/256 |
| 2011/0202670 | A1 * | 8/2011 | Zheng | 709/228 |

(Continued)

OTHER PUBLICATIONS

Mark Dye et al., "Network Fundamentals: CCNA Exploration Companion Guide", 2008, Cisco Press.*

(Continued)

*Primary Examiner* — Brian J Gillis
*Assistant Examiner* — Matthew Ballard
(74) *Attorney, Agent, or Firm* — Shumaker & Sieffert, P.A.

(57) ABSTRACT

In general, techniques are described for delegating responsibility for performing a connectivity protocol from one or more endpoint devices to network infrastructure situated along a network forwarding path connecting the endpoint devices. In some examples, an intermediate network device includes a connectivity protocol module of control unit that operates a connectivity protocol session on behalf of a server, wherein the server exchanges application data with the client using an application-layer communication session with the client. The connectivity protocol module monitors connectivity for the application-layer communication session with the connectivity protocol session by exchanging connectivity protocol messages for the connectivity protocol session with the client to determine a connectivity status for the communication session. The connectivity protocol module updates the server with the connectivity status for the communication session by sending a summary report message that includes the connectivity status for the communication session to the server.

18 Claims, 6 Drawing Sheets

(56) References Cited

U.S. PATENT DOCUMENTS

2011/0280134 A1* 11/2011 Zheng ............................ 370/241
2012/0281577 A1* 11/2012 Winter et al. ................. 370/252

OTHER PUBLICATIONS

Takayuki Warabino et al., "Load Sharing of Location-based Routing in Overlay Networks", 2008, IEEE.*
Maryam Homayouni et al., "Overload in SIP Servers: Evaluation and Improvement", 2009, IEEE.*
Katz et al., "Bidirectional Forwarding Detection (BFD)," Internet Engineering Task Force (IETF) RFC 5880, Jun. 2010, 49 pgs.
"OpenFlow Switch Specification Version 1.1.0", OpenFlow Consortium, Feb. 28, 2011, 56 pgs.
Katz et al., "BFD for Multipoint Networks," Network Working Group, Internet-Draft, draft-ietf-bfd-multipoint-00.txt. Oct. 18, 2011, 29 pgs.
Kompella et al., "Detecting Multi-Protocol Label Switched (MPLS) Data Plane Failures," Network Working Group, RFC 4379, Feb. 2006, 50 pgs.
Aggarwal et al., "Bidirectional Forwarding Detection (BFD) for MPLS Label Switched Paths (LSPs)," Internet Engineering Task Force, (IETF), RFC 5884, Jun. 2010, 12 pgs.
Saxena et al., "Detecting Data-Plane Failures in Point-to-Multipoint MPLS—Extensions to LSP Ping," Internet Engineering Task Force (IETF), RFC 6425, Nov. 2011, 28 pgs.
"OAM Functions and Mechanisms for Ethernet based networks," International Telecommunications Union Telecommunication Standardization Sector of (ITU-T) recommendation Y.1731, May 2006, 80 pp.

* cited by examiner

| SERVER IP | CLIENT IP | APPLICATION ID | LABEL | FAULT CRITERIA |
|---|---|---|---|---|
| S1 | D1 | A1 | L1 | DELAY |
| S1 | D2 | A1 | - | DELAY |
| S1 | D2 | A2 | - | UNRESPONSIVE |
| ••• | ••• | ••• | ••• | ••• |
| * | * | * | * | * |

FIG. 3

| CLIENT IP | APPLICATION ID | AVG. JITTER |
|---|---|---|
| D1 | A1 | 14 |
| D2 | A1 | 6 |

FIG. 5A

| CLIENT IP | APPLICATION ID | NOTIFICATION |
|---|---|---|
| D1 | A1 | FAILED |
| D2 | A1 | FAILED |

FIG. 5B

CONNECTIVITY PROTOCOL DELEGATION

TECHNICAL FIELD

The invention relates to computer networks and, more specifically, to connection monitoring in computer networks.

BACKGROUND

A computer network is a collection of interconnected computing devices that exchange data and share resources. In a packet-based network, such as the Internet, the computing devices communicate data by establishing communication sessions and communicating data in the form of variable-length data blocks referred to as packets. The packets are individually routed across the network from a source device to a destination device. The destination device extracts the data from the packets and assembles the data into its original form.

Software applications that execute on the computing devices and use packet-based protocols to communicate over a packet-based computer network often exchange connectivity messages, such as "keepalive" or "hello" messages, on the communication session to confirm that the communication session is operating and/or to receive statistics relating to performance of the communication session, for example. For example, some applications leverage built-in keepalive support provided by Transmission Control Protocol (TCP) implementations to maintain transport-layer connectivity for TCP sessions between application endpoints. Failure to receive a keepalive or hello message for a communication session may indicate an occurrence of a network event, such as a link failure, session failure, component failure or other event that may cause loss of connectivity.

SUMMARY

In general, techniques are described for delegating responsibility for performing application-level session connectivity monitoring from one or more endpoint devices to intermediate network infrastructure situated along a network forwarding path connecting the endpoint devices. In some examples, an application executing on a server device issues a request to an intermediate network device, such as a router, to monitor connectivity between the network device and one or more client devices engaged in corresponding communication sessions with the server application. Responsive to the request, the intermediate network device establishes one or more new connectivity protocol sessions (e.g., Bidirectional Forwarding Detection (BFD) sessions) for the communication sessions and executes a connectivity protocol to continually verify that connectivity for the forwarding path connecting the network device and the client devices meets or exceeds required parameters. In the event of a connectivity fault along any of the forwarding paths connecting the network device and the client devices, the intermediate network device notifies a server-side application of the connectivity fault, which may then undertake remedial action.

The techniques of this disclosure may provide one or more advantages. The techniques may, for example, leverage high-performance intermediate devices having specialized components and protocols for detecting and monitoring network connectivity. For example, the network device to which a server-side application delegates a connectivity protocol session may include specialized hardware optimized for executing the connectivity protocol, thereby enabling the network device in such instances to potentially execute the connectivity protocol with a much higher frequency and/or support many more sessions than is feasible using general-purpose hardware typically used to execute applications at the endpoints. Such higher frequency may provide more rapid detection of connectivity faults, potentially even at sub-second granularity. As another example, the techniques may significantly reduce overhead costs on the server associated with managing many hundreds or even thousands of simultaneous connectivity protocol sessions with corresponding clients by offloading such costs to the network. Further, because many such client-side applications or connecting forwarding paths may fail within a short time, i.e, have a degree of fate sharing, the techniques may enable summary notification of multiple connectivity failures from the intermediate network device to the server-side application. As a further example, in some instances, client-side applications may execute the connectivity protocol and offload the application-level session monitoring to one or more intermediate devices. Consequently, connectivity failures may in such instances correlate to client-side application performance, which may provide application-level insight into client-side application availability and load.

In one aspect, a method comprises operating a connectivity protocol session on behalf of a server with a network device situated on a bidirectional forwarding path connecting the server and a client, wherein the server exchanges application data with the client using an application-layer communication session with the client. The method also comprises monitoring, with the network device, connectivity for the application-layer communication session with the connectivity protocol session by exchanging connectivity protocol messages for the connectivity protocol session with the client to determine a connectivity status for the communication session. The method further comprises updating the server with the connectivity status for the communication session by sending a summary report message that includes the connectivity status for the communication session to the server.

In another aspect, an intermediate network device comprises a control unit having a processor. The intermediate network device also comprises a connectivity protocol module of the control unit that operates a connectivity protocol session on behalf of a server, wherein the server exchanges application data with the client using an application-layer communication session with the client, wherein the connectivity protocol module monitors connectivity for the application-layer communication session with the connectivity protocol session by exchanging connectivity protocol messages for the connectivity protocol session with the client to determine a connectivity status for the communication session, and wherein the connectivity protocol module updates the server with the connectivity status for the communication session by sending a summary report message that includes the connectivity status for the communication session to the server.

In another aspect, a system comprises a client, a server that exchanges application data with the client using an application-layer communication session with the client, and an intermediate network device situated on a bidirectional forwarding path connecting the server and a client. The intermediate network device comprises a control unit having a processor. The intermediate network device also comprises a connectivity protocol module of the control unit that operates a connectivity protocol session on behalf of the server, wherein the connectivity protocol module monitors connectivity for the application-layer communication session with the connectivity protocol session by exchanging connectivity protocol messages for the connectivity protocol session with the client to determine a connectivity status for the communication session, and wherein the connectivity protocol module updates the server with the connectivity status for the communication session by sending a summary report message that includes the connectivity status for the communication session to the server.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 3 is a block diagram illustrating an example data structure that defines multiple delegated connectivity protocol sessions operating in accordance with techniques described herein.

FIGS. 5A-5B depict block diagrams illustrating example content of summary report messages issued by a connectivity protocol sessions delegate in accordance with the described techniques.

Like reference characters denote like elements throughout the figures and text.

DETAILED DESCRIPTION

Figure 1:
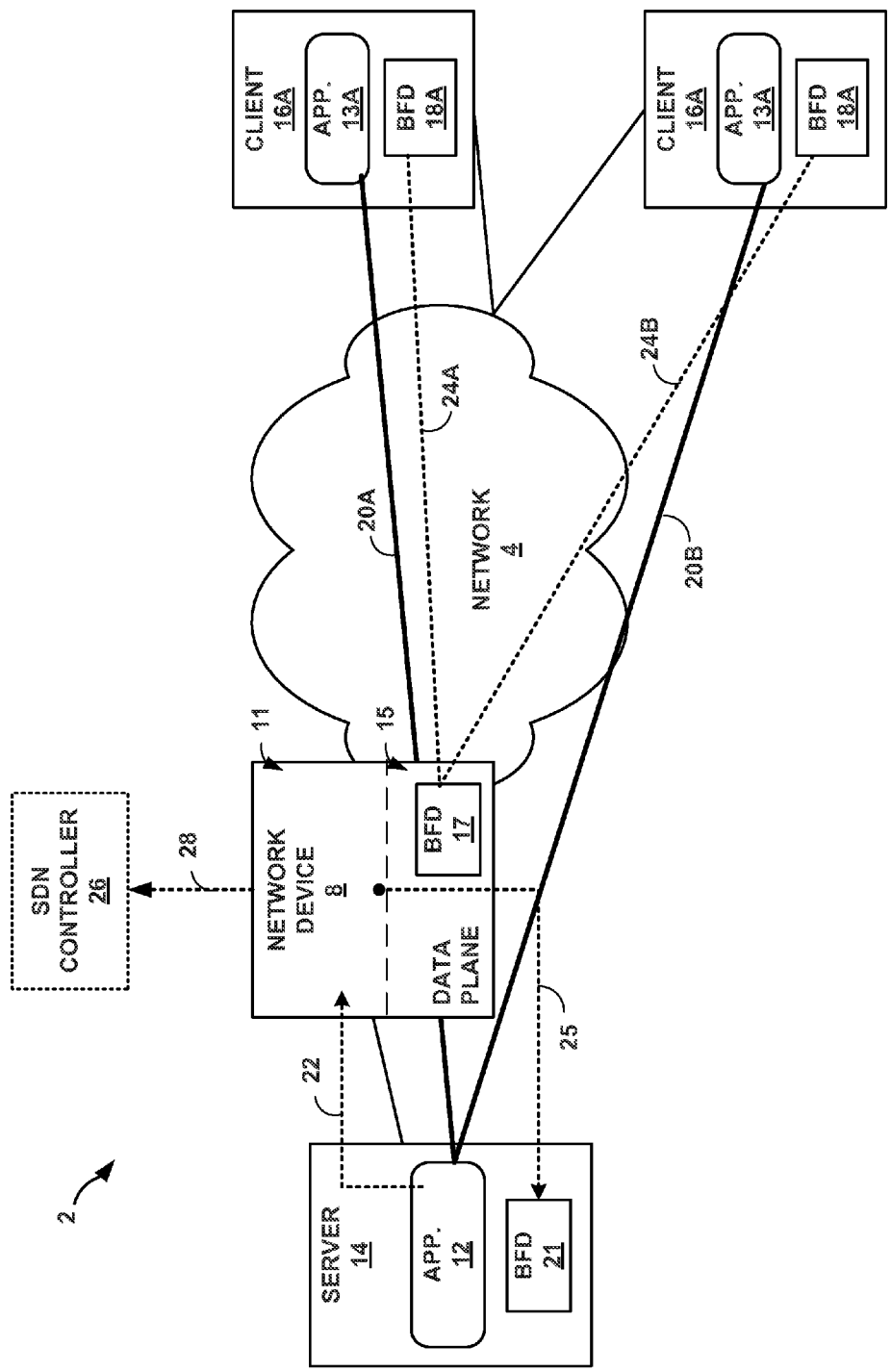
FIG. 1 is a block diagram illustrating an example computer network in which a network device monitors and verifies connectivity status with applications executing on devices on behalf of a delegating device according to techniques described herein.

FIG. 1 is a block diagram illustrating an example computer network in which an intermediate network device monitors and verifies connectivity status with applications executing on devices on behalf of a delegating device according to techniques described herein. In the example of FIG. 1, computer network 2 includes network device 4 connecting server 14 and clients 16A-16B (collectively, "clients 16"), which may represent a wide range of network-enabled devices. For example, server 14 and clients 16 may each be a router, switch, personal computer, server, modem, network telephone, television, television set-top box, firewall device, communications satellite, network appliance, or other network-enabled device.

Server 14 and clients 16 provide operating environments for software applications that communicate using multi-layered network stacks that conform to the Open Systems Interconnection (OSI) model or TCP/IP model, for instance. Network 4 provides infrastructure for facilitating packet-based communication sessions, and may include firewalls, gateways, routers, switches, communication links and other communication components. The communication links may be any type of computer network transmission medium. For instance, a communication link may be a fiber optic link, an Ethernet link, a wireless connection, and so forth. Network system 2 may in some instances represent a portion of a data center having multiple servers exchanging, and serving to external clients of the data, application data stored to storage arrays. In such instances, network 4 may represent a data link network (corresponding to Layer 2 of the OSI model), such as an Ethernet or Fibre Channel over Ethernet (FCoE) network, and server 14 and clients 16 may each represent one of the multiple servers of the data center in such instances. In some instances, network system 2 represents a service provider network having elements, including clients 16, managed by server 14, which may represent a Network Management Server (NMS).

Network device 8 of network 4 may represent any intermediate communication device (e.g., a router or switch) of network 4. For instance, network device 8 may represent an edge router that is a gateway router for server 14 to network 4. Network device 8 is divided into two logical or physical "planes" to include a control plane 11 and a "data" or "forwarding" plane 15 (illustrated as "data plane 15"). That is, network device 8 implements two separate functionalities, e.g., the routing/control provided by control plane 11 and forwarding/data functionalities provided by data plane 15. Data plane 15, also referred to as a forwarding plane, processes and forwards packets and L2 datagrams. For example, data plane 15 may comprise a plurality of forwarding units coupled by a high-speed switch fabric to handle data packets. In some embodiments, control plane 11 may include multiple service units that operate in a "service plane" to provide control plane functions.

In the example of FIG. 1, network device 8 of network 4 lies along bidirectional forwarding paths 20A, 20B (collectively, "bidirectional forwarding paths 20") connecting server 14 and respective clients 16A, 16B. For instance, bidirectional forwarding path 20A connects server 14 with client 16A at the network layer. Each of bidirectional forwarding paths 20 may include one or more interior links of network 4, an attachment circuit or access link connecting server 14 to network device 8 or edge device of network 4, as well as an attachment circuit or access link connecting the corresponding one of clients 16. In addition, each of bidirectional forwarding paths 20 may include one or more Label Switched Paths (LSPs) through network 4.

Bidirectional forwarding paths 20 transport network packets associated with one or more application-level communication sessions (e.g., corresponding to Layers 4-7 of the OSI model) to communicate application data between application 12 executing on server 14 and applications 13A-13B (collectively, "applications 13") executing on respective clients 16A-16B. Each application-level communication session may utilize a corresponding network layer communication session (e.g., corresponding to Layer 3 of the OSI model) to divide the application-layer data into packets for transport through network 4. The transport layer communication sessions may be connection-oriented, e.g., Transmission Control Protocol (TCP) sessions, or connectionless, e.g., User Datagram Protocol (UDP) sessions. Application 12 and applications 13 may represent a wide range of applications, including HyperText Transfer Protocol (HTTP), File Transfer Protocol (FTP), content delivery, and proprietary applications, for instance.

In accordance with techniques described in this disclosure, application 12 monitors and verifies application-level connectivity for each communication session with applications 13 by delegating, to intermediate network device 8, responsibility for performing a connectivity protocol session with respect to each of applications 13 or any of the supporting layers for exchanging application layer data via network 4 (e.g., the application, transport, network, or data link layers). In addition, the techniques may include extending the connectivity protocol to clients 16.

The connectivity protocol endpoints, in this example, are illustrated and represented by Bidirectional Forwarding Detection (BFD) module 21 of server, BFD module 17 of network device 8, and BFD modules 18A-18B of respective clients 16A-16B (illustrated in FIG. 1 as BFD 21, BFD 17, and BFD 18A-18B), BFD 18A-18B may be separate software applications that perform the connectivity protocol for respective clients 18A-18B. In some instances, BFD 18A-18B operate as a module, function, or other aspect of respective applications 13A-13B such that applications 13A-13B perform the connectivity protocol at the application-level by exchanging application-level data that includes connectivity protocol messages with BFD 17.

BFD 21 sends a delegation request 22 directing control plane 11 of network device 8 to establish (or assume responsibility for) a connectivity protocol session with each applications 13. In this way, server 14 registers the connectivity protocol sessions with upstream network device 8 and effectively delegates responsibility for operating the connectivity protocol sessions to the network.

In response to receiving delegation request 22, control plane 11 of network device 8 establishes (or assumes responsibility for) connectivity protocol sessions 24A-24B (collectively, "connectivity protocol sessions 24") for respective applications 13A-13B. In the illustrated example, control plane 11 establishes connectivity protocol sessions 24 by installing connectivity protocol session parameters to BFD 17 of data plane 15. BFD 17 exchanges connectivity protocol messages with BFD 18A-18B over respective bidirectional forwarding paths 20A-20B for respective connectivity protocol sessions 24 in accordance with the connectivity protocol. In this way, BFD 17 executed by the data plane of network device 8 operates connectivity protocol sessions 24 on behalf of BFD 21. Hardware support for BFD 17 provided by data plane 15 may permit BFD 17 to operate connectivity protocol sessions 24 at a much higher frequency (as measured by the interval between successive connectivity protocol messages for one of connectivity protocol sessions 24) and/or to operate many more connectivity protocol sessions than is possible using either server 14 or control plane 11 of network device 8. In some instances, BFD 17 may provide sub-second granularity.

The connectivity protocol for connectivity protocol sessions 24 may be, for instance, BFD, an Operations, Administration and Maintenance (OAM) tool such as OAM for Ethernet, Internet Protocol Ping, application keepalives (e.g., HTTP keepalives), LSP Ping, or another connectivity protocol that is operable to verify and/or monitor connectivity of one or more layers of bidirectional forwarding paths 20. OAM generally provides the activities, tools, standards and other techniques that involve operating, administering and maintaining connectivity in the L2 computer network. One such OAM tool, referred to as OAM Frame Loss Measurement, standardizes mechanisms for loss measurement in an Ethernet computer network and is described in the Internal Telecommunication Union Telecommunication Standardization Section (ITU-T) recommendation Y.1731, "OAM functions and mechanisms for Ethernet based networks," May, 2006, which is incorporated by reference herein in its entirety. Bidirectional Forwarding Detection is described in further detail in David Katz & David Ward, "Bidirectional Forwarding Detection (BFD)," Internet Engineering Task Force (IETF) Request for Comments (RFC) 5880, June, 2010, which is incorporated by reference herein in its entirety. In instances of network system 2 where the connectivity protocol is BFD, BFD control packets and Echo packets may be transported on bidirectional forwarding paths 20 as data link layer packet payloads, network layer packet payloads, transport layer packet payloads, or application layer data. Thus, BFD in instances where BFD control packets and Echo packets are application layer data is extended to monitor the application level at clients 16 by operation of respective BFDs 18 at the application level.

Control plane 11 of network device 8 issues summary report messages 25 to BFD 21 that notify BFD 21 of the connectivity statuses of communications sessions along bidirectional forwarding paths 20 according to connectivity protocol sessions 24. Control plane 11 may issue summary report messages 25 at a much lower frequency than BFD 17 executed by data plane 15 exchanges connectivity protocol messages (e.g., heartbeats or keepalives). For example, while BFD 17 may exchange connectivity protocol message on the order of tens of milliseconds, control plane 11 may issue summary report messages 25 to BFD 21 on the order of seconds. In this way, delegation of connectivity protocol operation to network device 8 by server 14 may substantially reduce connectivity protocol overhead on server 14, thereby preserving resources for execution of application 12 (and/or additional applications).

In some instances, BFD 17 may issue a summary report message 25 notifying BFD 21 of connectivity faults immediately upon detecting the connectivity faults by operation of any one or more of connectivity protocol sessions 24. Consequently, application 12 monitoring the state of the connectivity protocol sessions 24 receives rapid feedback of a connectivity fault despite otherwise receiving summary report messages 25 at a relatively slow frequency. Summary report messages 25 may each include connectivity-related information for each of connectivity protocol sessions 24. For example, in some instances, applications 13 of clients 16 (or elements of bidirectional forwarding paths 20 or a shared element thereof) may both fail during a same period defined by a frequency of summary report messages 25 issuance. Upon detecting the connectivity faults, BFD 17 may generate and issue the next summary report message 25 to include notifications of both connectivity faults for bidirectional forwarding paths 20. In this way, processing of summary report message 25 may be further optimized by application 12 monitoring the state of the connectivity protocol sessions 24.

In some instances, BFD 17 (or a control plane analogue of BFD 17 executed by control plane 11) operates as a BFD proxy for BFD 21. For example, BFD 21 and BFD 17 may implement a shared connectivity protocol session. When BFD 17 receives a connectivity protocol message from BFD 21, BFD 17 replicates and forwards the connectivity protocol message to each of BFDs 18. BFD 17 may modify each replicated connectivity protocol message, as needed, to conform the replicated connectivity protocol message to the corresponding one of connectivity protocol session 24. For instance, BFD 17 may include the proper authentication information for the corresponding one of connectivity protocol sessions 24 in Echo packets (where the connectivity protocol is BFD). In some instances, connectivity protocol messages from multiple servers toward the same client may be summarized by an instance of BFD 17 operating on an instance of network device 8.

In some instances, BFD 17 operates as a BFD proxy for BFD 21 by first snooping network traffic traversing network device 8, intercepting connectivity protocol messages for connectivity protocol sessions between BFD 21 and BFDs 18, and then autonomously assuming responsibility for the connectivity protocol sessions. In other words, rather than affirmatively receiving a delegation from server 14 (e.g., by delegation message 20), BFD 17 detects an already-established connectivity protocol session (or session in the process of being established) and takes over responsibility for the further establishment and operation of the connectivity protocol session. BFD 17 may renegotiate/adjust the parameters of the assumed connectivity protocol session to, e.g., increase the frequency of corresponding connectivity protocol messages with the partnered one of BFDs 18. BFD 17 additionally proxies connectivity protocol messages issued by BFD 21 toward the partnered one of BFDs 18. In this way, network device 8 may improve the rapidity of connectivity faults without requiring any modifications to BFD 21 of server 14. As described below with respect to FIG. 4, BFD connectivity protocol messages may in some instances include a flag or other information designating a corresponding connectivity protocol session as permitting assumption by BFD 17.

Delegating connectivity protocol sessions 24 from server 14 to the network infrastructure, in the form of network device 8 in the example of FIG. 1, in accordance with the described techniques may enable a higher heartbeat/keepalive frequency and/or a greater number of connectivity protocol sessions to be supported, particularly when BFD 17 performing connectivity protocol sessions 24 messaging and processing is executed by data plane 15 having specialized and/or dedicated hardware for performing the connectivity protocol. Such higher frequency may provide more rapid detection of connectivity faults, potentially even at sub-second granularity. In addition, by offloading such costs to the network infrastructure, the techniques may significantly reduce overhead costs on server 14 in instances where server 14 manages many hundreds or even thousands of simultaneous connectivity protocol sessions with corresponding clients. Because many client-side applications 13 or connecting bidirectional forwarding paths 20 may fail within a short time, the techniques may further enable summary notification of multiple connectivity failures from network device 8 to the server-side application 12 using summary report messages 25. As a still further example, client-side applications 13 execute the connectivity protocol in the example of FIG. 1, and connectivity failures may therefore correlate to client-side application 13 performance, which may provide application-level insight into client-side application 13 availability and load.

In some instances, network 4 includes elements that are programmable using software-defined networking (SDN) techniques, such as OpenFlow. Optional SDN controller 26 communicates with network device 8 and other elements of network 4 to define data paths for traffic flows traversing the network, such as bidirectional forwarding paths 20. Data paths may include LSPs, for instance. Each of the network elements configurable in this way performs packet lookups and forwarding according to one or more flow tables each having one or more flow entries received from SDN controller 26. Each flow entry specifies one or more match fields and a set of instructions to apply to packets the match values of the match fields. A match field may match any of the packet data unit parameters, e.g., source and destination MAC and IP addresses. The set of instructions associated with each flow entry describe PDU forwarding and PDU modifications for traffic flows. Additional details regarding OpenFlow are found in "OpenFlow Switch Specification version 1.1.0", OpenFlow Consortium, February 2011, which is incorporated by reference herein.

Network device 8 in such instances may associate applications with traffic flows and with links of bidirectional forwarding paths 20. If, in accordance with techniques of this disclosure, BFD 17 determines that an OAM or other connectivity protocol session has a connectivity fault, then each of the traffic flows supervised by that connectivity protocol session inherits the connectivity fault. Control plane 11 of network device 8 may therefore issue a fault notification message 28 to SDN controller 26 indicating the connectivity fault for the connectivity protocol session. Fault notification message 28 may include additional information describing the connectivity protocol session and attendant application and/or traffic flow associations. Responsive to receiving and processing fault notification message 28, SDN controller 26 may remediate the faulty ones of bidirectional forwarding paths 20 by computing and installing flow entries in elements of network 4 in order to reroute the faulty bidirectional forwarding paths.

Figure 2:
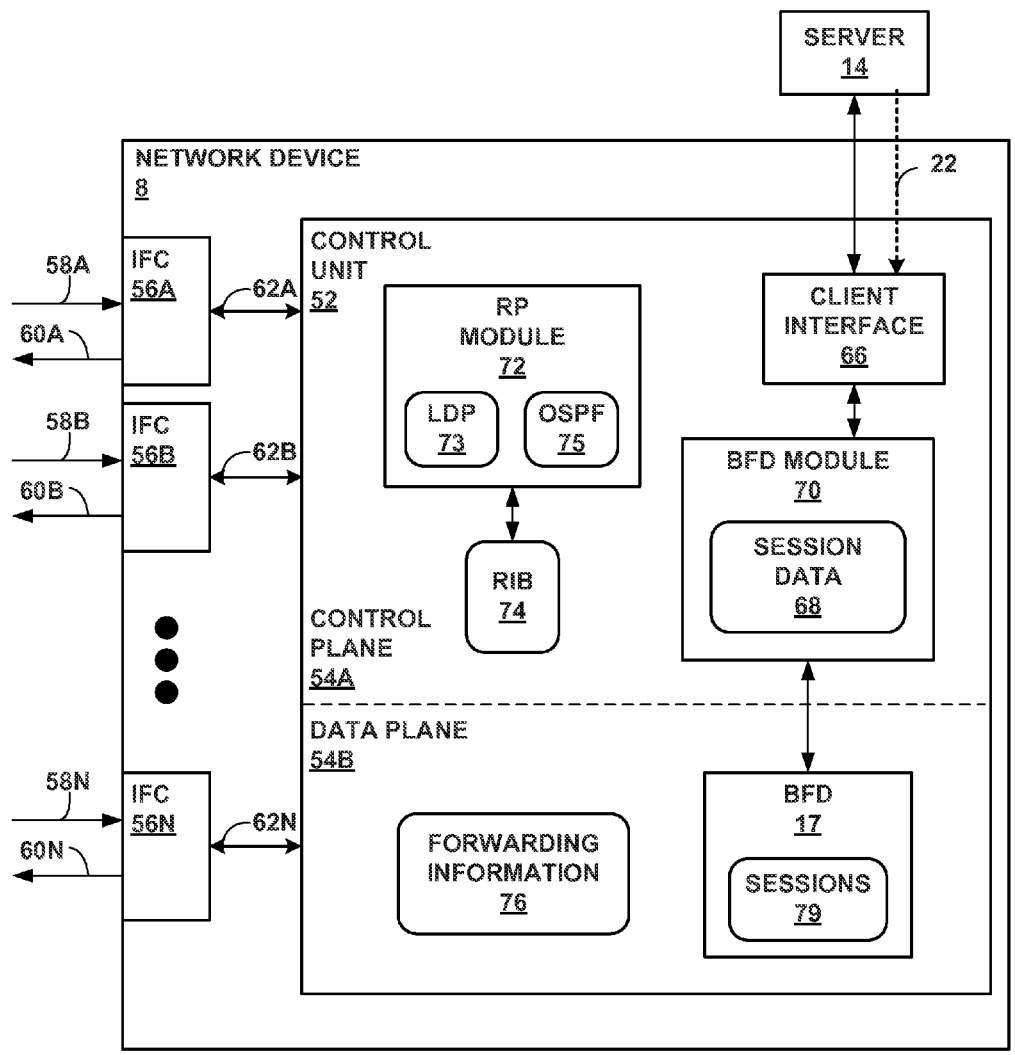
FIG. 2 is a block diagram illustrating an example network device that assumes responsibility for performing connectivity protocol sessions on behalf of an endpoint in accordance with techniques described herein.

FIG. 2 is a block diagram illustrating an example network device that assumes responsibility for performing connectivity protocol sessions on behalf of an endpoint in accordance with techniques described herein. For purposes of illustration, network device 8 may be described below within the context of an example network system 2 of FIG. 1 and may represent network device 8 of the example network system 2. Moreover, while described with respect to a particular network device, e.g., a router, the techniques may be implemented by any type of network device operable to assume responsibility for performing connectivity protocol sessions, e.g., a switch, network controller, or network appliance.

Network device 8 includes a control unit 52 and interface cards 56A-56N ("IFCs 56") coupled to control unit 52 via internal links 62A-62N. Control unit 52 may comprise one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 52 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 52 is divided into two logical or physical "planes" to include a first control or routing plane 54A and a second data or forwarding plane 54B. That is, control unit 52 implements two separate functionalities, e.g., the routing and forwarding functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 54A of control unit 52 executes the routing functionality of network device 8. In this respect, routing protocol (RP) module 72 of control plane 54A represents hardware or a combination of hardware and software of control unit 52 that implements routing protocols, e.g. Open Shortest Path First (OSPF) 75 by which routing information stored in routing information base 74 ("RIB 74") may be determined. RIB 4 may include information defining a topology of a network, such as network 4. Control plane 54A may resolve the topology defined by routing information in RIB 74 to select or determine one or more routes through the network. Control plane 54A may then update data plane 54B with these routes, where data plane 54B maintains these routes as forwarding information 76. Forwarding or data plane 54B represents hardware or a combination of hardware and software of control unit 52 that forwards network traffic in accordance with forwarding information 76.

Routing protocol module 72 may additionally execute protocols associated with Multiprotocol Label Switching (MPLS), including Label Distribution Protocol (LDP) 73, for establishing, operating, and maintaining label switched paths (LSPs) that ingress at, egress from, or traverse network device 8. Routing protocol module 72 may install forwarding information for LSPs to forwarding information 76.

Control plane 54A further includes client interface 66 by which server 14, or in some instances an administrator using a command line interface (CLI) or graphical user interface (GUI), receive delegation request 22 to configure session data 68 for one or more connectivity protocol sessions in BFD module 17. As described above, client interface 66 may expose a CLI or GUI for receiving delegation request 22. Client interface 66 may also receive delegation request 22 via a communication protocol, such as Simple Network Management Protocol (SNMP), Internet Control Message Protocol (ICMP), Netconf, Remote Procedure Calls (RPCs), or a proprietary protocol. Client interface 66 processes delegation request 22 in accordance with the communication protocol and provides session data therein to BFD module 70 for configuration as session data 68.

Session data 68 stores one or more connectivity protocol session records each including connectivity protocol parameters that define the operation of the corresponding connectivity protocol session. For example, a connectivity protocol session record may store a requested connectivity protocol message (e.g., heartbeat) frequency, a destination network address for connectivity protocol messages, a network address for the requesting server (e.g., server 14), a summary report message update rate and/or triggers, an application identifier, BFD discriminators, OAM or other statistics descriptive of bidirectional forwarding path performance characteristics, criteria for a connectivity fault, and so on. Triggers and criteria for a connectivity fault defined by session data 68 connectivity protocol session records may include non-responsive client applications, excessive delay (latency), excessive jitter between connectivity fault messages received, or application-specific criteria. Statistics may include loss measurement statistics, delay and/or jitter metrics, and the like.

BFD 70 is a connectivity protocol module that installs representations of session data 68 to BFD 17 of data plane 54B to facilitate the execution, by BFD 17, of one or more connectivity protocol sessions 79 (illustrated as "sessions 79"). In some instances, BFD 17 monitors the operations of connectivity protocol sessions and traps to BFD module 70 when defined criteria for a connectivity fault are met (e.g., such as those described above with regard to triggers and criteria for connectivity faults). BFD module 70 generates a summary report message that describes the connectivity fault and sends the summary report message to server 14 via client interface 66.

In some instances, BFD module 70 operates as a connectivity protocol proxy for server 14. For example, server 14 and BFD module 70 may establish a shared connectivity protocol session operating at a relatively low frequency vis-à-vis connectivity protocol sessions 79. In this way, server 14 can be updated upon individual client changes and receive summarized information at a slower frequency.

In some instances, forwarding information 76 includes filters or other forwarding information that direct data plane 54B to pass connectivity protocol messages on the slow path including control plane 54A, effectively snooping such messages from the network. Because network device 8 lies along bidirectional forwarding paths 20, in such instances, BFD module 70 may receive connectivity protocol control messages from data plane 54B and determine that server 14 is attempting to establish a connectivity protocol session with another device. Upon such a determination, BFD module 70 assumes the connectivity protocol session with the other device. In some instances, BFD module 70 only assumes the connectivity protocol session if such assumption is specifically designated as allowable in the corresponding connectivity protocol control messages.

BFD module 70 may modify the parameters of an assumed connectivity protocol session to, for instance, increase the frequency of connectivity protocol messages for the connectivity protocol session and then install the parameters to a record in connectivity protocols sessions 79 for execution by BFD 17 of data plane 54B. BFD 70 may monitor the connectivity protocol session being executed by BFD 17, and respond accordingly to connectivity protocol messages (e.g., Echo messages) for the session issued by server 14.

In some instances, aspects of data plane 54B are distributed to a number of distributed forwarding units, such as packet forwarding engines, each associated with a different one or more IFCs 56. In these instances, BFD 17 may be distributed to the distributed forwarding units to enable high-frequency operation of connectivity protocols within the data plane.

FIG. 3 is a block diagram illustrating an example data structure that defines multiple delegated connectivity protocol sessions operating in accordance with techniques described herein. In this example, table 80 is an associative data structure that includes connectivity protocol session records 84A-84N (collectively, "connectivity protocol session records 84") each storing connectivity protocol parameters that define the operation of the corresponding connectivity protocol session. Table 80 may represent an example instance of session data 68 of FIG. 2 maintained by intermediate network device 8.

In the illustrated example, table 80 includes columns 82A-82E that each specifies one of the connectivity protocol parameters for connectivity protocol sessions. Connectivity protocol session records 84 may be received in delegation messages, such as delegation message 22 of FIG. 1. For each of connectivity protocol session records 84, server IP address ("server ILP") 82A specifies a network address for one endpoint of the corresponding connectivity protocol session, client IP address ("client IP") 82B specifies a network address for the other endpoint of the corresponding connectivity protocol session, application identifier ("application ID") 82C specifies a unique identifier for an application executing on the server having the network address specified in server IP address 82A, label 82D specifies an LSP label and/or an outbound virtual or physical interface for connectivity protocol messages for the corresponding connectivity protocol session, and fault criteria 82E specifies criteria indicating a connectivity fault for the corresponding connectivity protocol session. BFD module 70 may install all or portions of each of connectivity protocol session records 84 to BFD 17 for executing the connectivity protocol sessions on data plane 54B.

In various examples, connectivity protocol session records 84 may specify additional connectivity protocol session parameters or may include variable fields for storing statistics tracking the operation of the connectivity protocol sessions. For example, a connectivity protocol session record may store a requested heartbeat frequency, a summary report message update rate, BFD discriminators, OAM or other statistics descriptive of bidirectional forwarding path performance characteristics, and so on.

Figure 4:
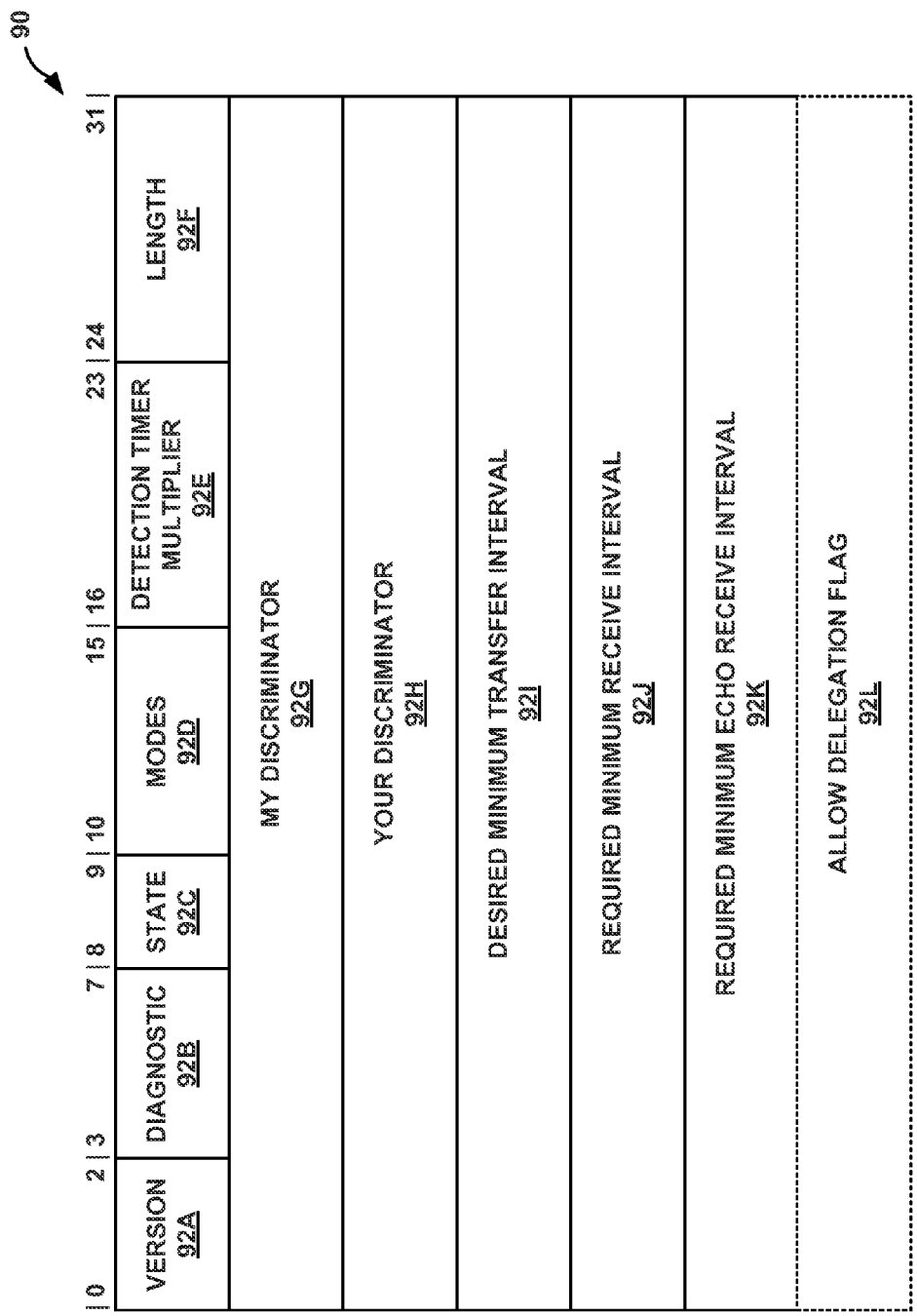
FIG. 4 is a block diagram illustrating an example bidirectional forwarding detection control message extended to include a field for designating a bidirectional forwarding detection session as delegable according to techniques described in this disclosure.

FIG. 4 is a block diagram illustrating an example bidirectional forwarding detection control message extended to include a field for designating a bidirectional forwarding detection session as delegable according to techniques described in this disclosure. Bidirectional forwarding detection (BFD) control message 90 includes standard fields 92A-92K that describe parameters of a corresponding BFD session being established in accordance with the BFD protocol. In addition, BFD control message 90 is extended to include allow delegation flag field 92L, which specifies whether the corresponding BFD session is delegable to network infrastructure on behalf of a BFD session endpoint. Allow delegation flag field 92L is illustrated as a 32-bit field for illustrative purposes only. Allow delegation flag field 92L may be a 1-bit or n-bit field in various instances.

The following example is described with respect to network system 2 of FIG. 1. Server 14 attempts to establish a BFD session with client 16A by issuing BFD control message 90 to client 16A. If allow delegation flag field 92L indicates a delegable BFD session (e.g., a non-zero value), network device 8 may assume responsibility for the BFD session on behalf of server 14 using techniques described above. However, if allow delegation flag field 92L indicates a non-delegable session (e.g. a zero value), network device is prevented from assuming responsibility for the BFD session and forwards the BFD control message 90 to client 16A unmodified.

FIGS. 5A-5B depict block diagrams illustrating example content of summary report messages issued by a connectivity protocol sessions delegate in accordance with the described techniques. Summary report message 100 of FIG. 5A includes report records 104A-104B corresponding to separate connectivity protocol sessions operated by the delegate, e.g., network switch 8. Report records 104A-104B each includes information uniquely identifying the connectivity protocol sessions to the delegator, e.g., server 14. In the illustrated example, the identifying information is a combination of client network address 102A and application identifier 102B. Summary report message 100 also reports the average jitter experienced by the connectivity protocol sessions since the previous summary report message sent by the delegate for purposes of reporting the average jitter. The value for the average jitter for report records 104A-104B is specified by average jitter ("avg, jitter") field 102C. Various instances of summary report message 100 may include many additional types of performance statistics for the reported connectivity protocol sessions, including delay, number of missed connectivity protocol messages, and so forth. Instances of summary report message 100 may be periodically generated and issued by the delegate to provide a summary report of bidirectional forwarding path and application-level performance at intervals. A delegator, e.g., server 14, may receive and process summary report message 100 using fewer control plane resources than may otherwise be required to operate all of the corresponding connectivity protocol sessions.

Summary report message 110 of FIG. 5B includes report records 114A-114B corresponding to separate connectivity protocol sessions operated by the delegate, e.g., network switch 8. Report records 114A-114B each includes information uniquely identifying the connectivity protocol sessions to the delegator, e.g., server 14. In the illustrated example, the identifying information is a combination of client network address 112A and application identifier 112B. Summary report message 110 notifies the delegator, using notification field 112C, that the delegate has identified connectivity protocol sessions for which there is a connectivity fault. In this example, each of report records 114A-114B indicates a connectivity fault for the corresponding connectivity protocol sessions. In this way, the delegator is simultaneously notified of connectivity faults for multiple connectivity protocol sessions. This may reduce control plane resources required to serially receive individual notifications.

Figure 6:
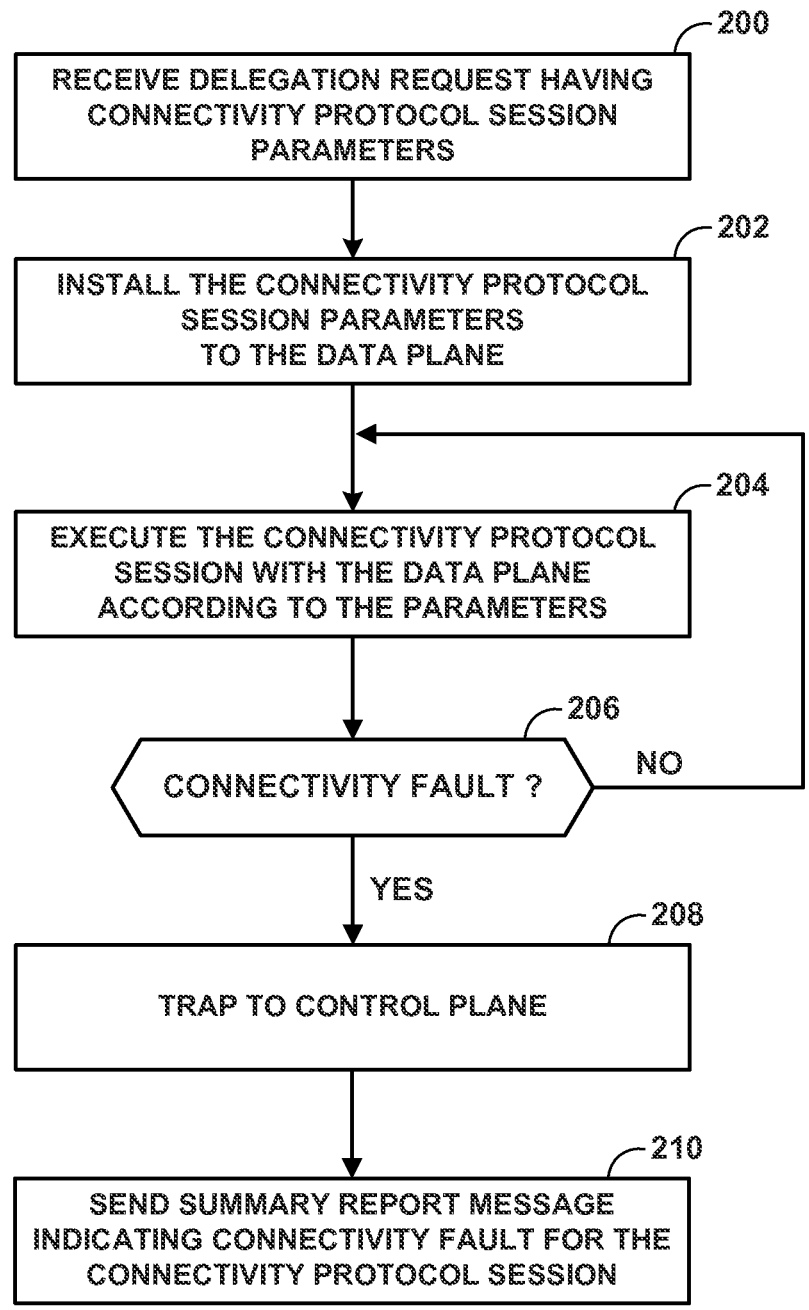
FIG. 6 is a flowchart illustrating an example mode of operation of a network device that is delegated responsibility for a connectivity protocol session in accordance with techniques described herein.

FIG. 6 is a flowchart illustrating an example mode of operation of a network device that is delegated responsibility for a connectivity protocol session in accordance with techniques described herein. The example mode is described with respect to network device 8 of FIG. 1. Initially, control plane 11 of network device 8 receives delegation request 22 that includes connectivity protocol session parameters for a connectivity protocol session (200). The control plane 11 processes delegation request 22 to extract and install the connectivity protocol session parameters to BFD 17 of data plane (202).

BFD 17 establishes a new (or assumes responsibility for an existing) connectivity protocol session and executes the connectivity protocol session in accordance with the connectivity protocol session parameters (204). Upon detecting a connectivity fault (YES branch of 206), BFD 17 sends a trap notifying a control plane 11 process of the connectivity fault (208). The trap may include a notification message sent over a socket connection between control plane 11 and data plane 15, for instance. On receiving the trap, control plane 11 sends, to server 14, a summary report message 25 indicating the connectivity fault for the connectivity protocol session (210).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
intercepting, with a network device situated on a bidirectional forwarding path connecting a server and a client of the server, a connectivity protocol message from the server and directed to the client, wherein the intercepted connectivity protocol message identifies a connectivity protocol session between the server and the client and specifies whether the connectivity protocol session is delegable;
assuming, with the network device and in response to determining based on the intercepted connectivity protocol message that the connectivity protocol session is delegable, responsibility for operating the connectivity protocol session on behalf of the server and in accordance with the intercepted connectivity protocol message;
monitoring, with the network device, connectivity for an application-layer communication session between an application executing on the server and the client by exchanging, by the network device and with the client, application-layer data that includes connectivity protocol messages for the connectivity protocol session with the client to determine a connectivity status for the application-layer communication session,
wherein each of the connectivity protocol messages specifies a unique identifier for the application executing on the server; and updating the server with the connectivity status for the application-layer communication session by sending a summary report message that includes the connectivity status for the application-layer communication session to the server.

2. The method of claim 1, further comprising:
receiving, with the network device, a delegation request from the server that specifies parameters for the connectivity protocol session; and
operating the connectivity protocol session in accordance with the parameters for the connectivity protocol session.

3. The method of claim 1, further comprising:
installing, with a control plane of the network device, parameters for the connectivity protocol session to a data plane of the network device, wherein operating the connectivity protocol session comprises executing the connectivity protocol session with the data plane of the network device.

4. The method of claim 1,
wherein each of the connectivity protocol messages conforms to an application keepalive message for the application executing on the server.

5. The method of claim 1,
wherein the client is a first client, wherein the application-layer communication session is a first application-layer communication session, wherein the connectivity protocol session is a first connectivity protocol session, and wherein the bidirectional forwarding path comprises a first bidirectional forwarding path, the method further comprising:
operating a second connectivity protocol session on behalf of the server with the network device further situated on a second bidirectional forwarding path connecting the server and a second client, wherein the server exchanges application data with the second client using a second application-layer communication session with the second client;
monitoring connectivity for the second application-layer communication session with the second connectivity protocol session to determine a connectivity status for the second application-layer communication session, wherein the summary report message includes the connectivity status for the second application-layer communication session and the connectivity status for the second application-layer communication session.

6. The method of claim 1,
wherein the intercepted connectivity protocol message specifies a first frequency for connectivity protocol messages for the connectivity protocol session, the method further comprising: modifying, with the network device, parameters of the connectivity protocol session to increase the frequency for the connectivity protocol messages for the connectivity protocol session to a second frequency;
exchanging connectivity protocol messages for the connectivity protocol session with the client in accordance with the second frequency; and
exchanging connectivity protocol messages for the connectivity protocol session with the server in accordance with the first frequency.

7. The method of claim 1, further comprising:
associating, with the network device, traffic flows with the bidirectional forwarding path that carries the traffic flows; and
responsive to determining the connectivity status for the application-layer communication session, updating a software-defined networking controller with the connectivity status for the application-layer communication session in association with identifiers for the traffic flows.

8. The method of claim 1, wherein the network device comprises an intermediate router having a control plane and data plane, wherein the data plane comprises a Bidirectional Forwarding Detection module having dedicated hardware to support a Bidirectional Forwarding Detection protocol, and wherein the Bidirectional Forwarding Detection module operates the connectivity protocol session.

9. An intermediate network device comprising: a control unit having a processor; and
a connectivity protocol module configured for execution by the control unit to intercept a connectivity protocol message from a server and directed to a client of the server, wherein the intermediate network device is situated on a bidirectional forwarding path connecting the server and the client,
wherein the server exchanges, via an application-layer communication session for an application executing on the server, application data with the client, and
wherein the intercepted connectivity protocol message identifies a connectivity protocol session between the server and the client and specifies whether the connectivity protocol session is delegable,
wherein the connectivity protocol module is further configured to assume, in response to determining based on the intercepted connectivity protocol message that the connectivity protocol session is delegable, responsibility for operating the connectivity protocol session on behalf of the server and in accordance with the intercepted connectivity protocol message, wherein the connectivity protocol module is further configured to monitor, with the connectivity protocol session, connectivity for an application-layer communication session between an application executing on the server and the client by exchanging application-layer data that includes connectivity protocol messages for the connectivity protocol session with the client to determine a connectivity status for the application-layer communication session, wherein each of the connectivity protocol messages specifies a unique identifier for the application executing on the server, and wherein the connectivity protocol module is further configured to update the server with the connectivity status for the application-layer communication session by sending a summary report message that includes the connectivity status for the application-layer communication session to the server.

10. The intermediate network device of claim 9, further comprising:
a client interface configured for execution by the control unit to receive a delegation request from the server that specifies parameters for the connectivity protocol session,
wherein the connectivity protocol module operates the connectivity protocol session in accordance with the parameters for the connectivity protocol session.

11. The intermediate network device of claim 9, further comprising:
a data plane comprising one or more forwarding units,
wherein the connectivity protocol module is further configured to install parameters for the connectivity protocol session to the data plane, and wherein a Bidirectional Forwarding Detection module of the data plane is configured to operate the connectivity protocol session by executing the connectivity protocol session.

12. The intermediate network device of claim 11,
wherein the Bidirectional Forwarding Detection module comprises dedicated hardware to support a Bidirectional Forwarding Detection protocol, and wherein the Bidirectional Forwarding Detection module is further configured to operate the connectivity protocol session in accordance with the Bidirectional Forwarding Detection protocol.

13. The intermediate network device of claim 9,
wherein each of the connectivity protocol messages conforms to an application keepalive message for the application executing on the server.

14. The intermediate network device of claim 9,
wherein the client is a first client, wherein the application-layer communication session is a first application-layer communication session, wherein the connectivity protocol session is a first connectivity protocol session,
wherein the connectivity protocol module is further configured to operate a second connectivity protocol session on behalf of the server,
wherein the server exchanges application data with the second client using a second application-layer communication session with the second client.
wherein the connectivity protocol module is further configured to monitor connectivity for the second application-layer communication session with the second connectivity protocol session to determine a connectivity status for the second application-layer communication session, and
wherein the summary report message further includes the connectivity status for the second application-layer communication session.

15. The intermediate network device of claim 9,
wherein the intercepted connectivity protocol message specifies a first frequency for connectivity protocol messages for the connectivity protocol session,
wherein the connectivity protocol module is further configured to modify parameters of the connectivity protocol session to increase the frequency for the connectivity protocol messages for the connectivity protocol session to a second frequency,
wherein the connectivity protocol module is further configured to exchange connectivity protocol messages for the connectivity protocol session with the client in accordance with the second frequency, and wherein the connectivity protocol module is further configured to exchange connectivity protocol messages for the connectivity protocol session with the server in accordance with the first frequency.

16. The intermediate network device of claim 9,
wherein the connectivity protocol module is further configured to associate traffic flows with a bidirectional forwarding path that carries the traffic flows,
wherein the connectivity protocol module, responsive to determining the connectivity status for the application-layer communication session, is further configured to update a software-defined networking controller with the connectivity status for the application-layer communication session in association with identifiers for the traffic flows.

17. A system comprising:
a client;
a server that exchanges, via an application-layer communication session for an application executing on the server, application data with the client; and
an intermediate network device situated on a bidirectional forwarding path connecting the server and the client, the intermediate network device comprising:
a control unit having a processor;
a connectivity protocol module configured for execution by the control unit to intercept a connectivity protocol message from the server and directed to the client,
wherein the intercepted connectivity protocol message identifies a connectivity protocol session between the server and the client and specifies whether the connectivity protocol session is delegable,
wherein the connectivity protocol module is further configured to assume, in response to determining based on the intercepted connectivity protocol message that the connectivity protocol session is delegable, responsibility for operating the connectivity protocol session on behalf of the server and accordance with the intercepted connectivity protocol message,
wherein the connectivity protocol module is further configured to monitor connectivity for the application-layer communication session with the connectivity protocol session by exchanging application-layer data that includes connectivity protocol messages for the connectivity protocol session with the client to determine a connectivity status for the application-layer communication session, wherein each of the connectivity protocol messages specifies a unique identifier for the application executing on the server, and wherein the connectivity protocol module is further configured to update the server with the connectivity status for the application-layer communication session by sending a summary report message that includes the connectivity status for the communication session to the server.

18. The system of claim 17,
wherein the client is a first client, wherein the application-layer communication session is a first application-layer communication session, wherein the connectivity protocol session is a first connectivity protocol session,
wherein the connectivity protocol module is further configured to operate a second connectivity protocol session on behalf of the server,
wherein the server exchanges application data with the second client using a second application-layer communication session with the second client,
wherein the connectivity protocol module is further configured to monitor connectivity for the second application-layer communication session with the second connectivity protocol session to determine a connectivity status for the second application-layer communication session, and
wherein the summary report message further includes the connectivity status for the second application-layer communication session.

* * * * *